GEORGE B. TURRELL, OF NEW YORK. N. Y.

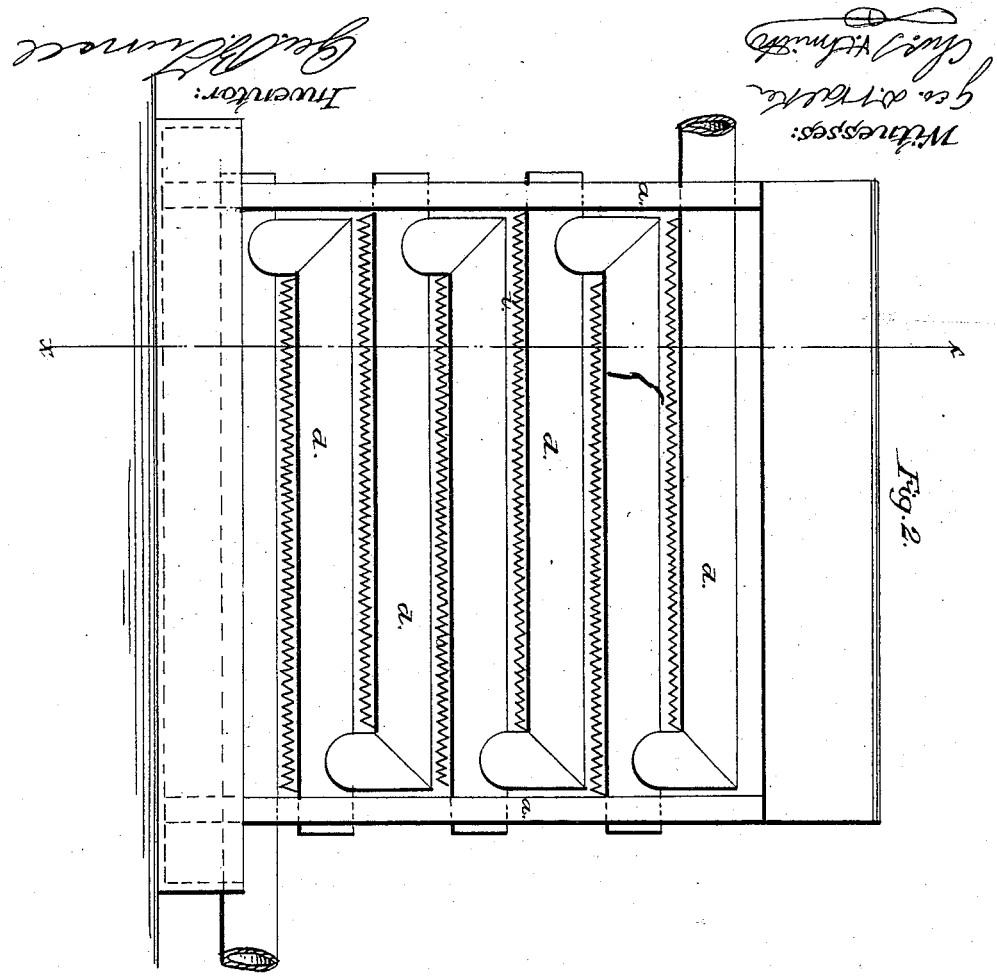
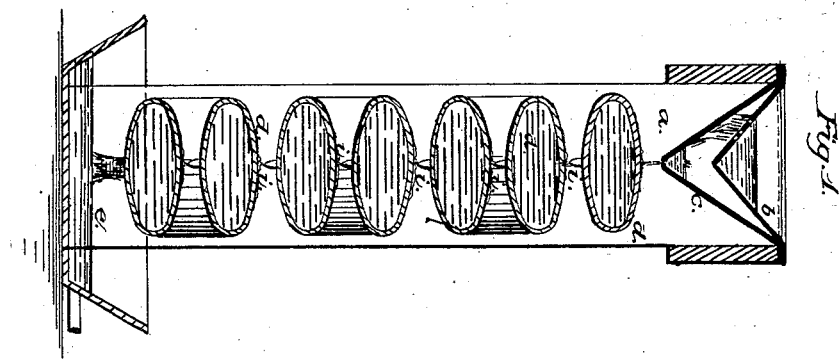

Letters Patent No. 85,190, dated December 22, 1868.

IMPROVEMENT IN COOLERS FOR BEER AND OTHER LIQUIDS.

The Schedule referred to in these Letters Patent and making part of the same.

*To all whom it may concern:*

Be it known that I, GEORGE B. TURRELL, of the city and State of New York, have invented, made, and applied to use, a certain new and useful Improvement in Coolers for Beer and other Liquids; and I do hereby declare the following to be a full, clear, and exact description of the said invention, reference being had to the annexed drawing, making part of this specification, wherein—

Figure 1 is a vertical section of my improved cooler, at the line $x\ x$ of Figure 2, which is a side elevation of said cooler.

Similar marks of reference denote the same parts.

In Letters Patent, granted to J. L. Baudelot, November 1, 1859, a vertical range of circular pipes is provided, over which the beer, or other liquid, trickles and passes from one pipe to another by a series of downward projections.

My present invention is an improvement upon the aforesaid Letters Patent.

In the use of round pipes for a beer-cooler, the liquid flows rapidly over the pipes, and is but little detained in contact with the cooling-surfaces, because the liquid travels a semicircle in passing around the pipe, and the capillary attraction has but little power to detain the liquid, and cause an accumulation, in the form of a viscid stratum, of some thickness, adhering to the under portion of the pipe.

The nature of my said invention consists in a series of horizontal tubes, in a vertical or nearly vertical range, said tubes being flattened, so as to be considerably wider in their horizontal diameter than in their vertical diameter, by means of which the following new and useful features are attained by my said cooler:

First, a cooler, having the same extent of cooling-surface, can be placed in much less space vertically, and thereby require a less head of water for its supply. A round pipe, when flattened, has the same area of surface, but a range of flattened pipes, of the same area, will not stand as high as a range of the same number of circular pipes, the space between the two forms of pipes corresponding.

Second, the sectional area of the water-way through the cooler will be lessened by the flattening of the pipes, and less water will be required in cooling the beer or other liquid, because a larger cooling-surface is obtained, in proportion to the capacity of the apparatus, for the flow of the cooling-liquid.

Third, in a given space, my present apparatus can contain a larger number of pipes, and present a greater extent of cooling-surface, than in apparatus heretofore made.

Fourth, with a definite supply of liquid to be cooled, upon this apparatus there will be the same quantity running off therefrom, but there will be a greater quantity of liquid upon the surface of the apparatus than with circular pipes; hence the time consumed by each particle of liquid in trickling from the top to the bottom of the apparatus will be increased, and the cooling-liquid will have a better opportunity to abstract the caloric. This increased quantity of liquid sustained by the surface of the apparatus is due to two causes: first, that the apparatus itself has a greater area of surface, in proportion to the water-way, in the tubes; and, second, that gravity does not act so rapidly upon the liquid, to cause the same to run with as much speed, while upon the flattened upper surface of the pipes, as when the pipes are round; and when the liquid is running along the under surfaces of the pipes, the cohesive attraction holds the liquid in the pipe against the action of gravitation; hence, at these portions of the apparatus, the stratum of liquid is much thicker than on the other portions of the pipe, or upon a circular tube.

Fifth, the liquid to be cooled, passing in a stratum along the under surfaces of the pipes, is in the best position for being cooled, because its caloric rises into and is absorbed by the cool water in the pipe above that stratum of liquid. Thus the heat passes rapidly upwards from the liquid to be cooled into the cooling-liquid, in accordance with the laws governing the transmission of heat.

I find, practically, that a great saving of water is effected in my said apparatus, and the liquid to be cooled is reduced in temperature more rapidly and thoroughly than heretofore.

In the drawing, $a\ a$ are standards, sustaining the distributing-trough $b$ and sprinkling-trough $c$, from which the liquid runs with uniformity upon the upper pipe of the range of pipes $d$, and passes, from one to the other, from the ranges of downward projections $i$, and is received in the pan $e$, at the bottom.

The pipes of the range are connected to each other at alternate ends, so that water supplied at the lowest pipe in the range circulates through the same, upward, and passes off from the upper pipe.

The pipes in such range are flattened, as shown, for the purposes aforesaid, and the relative proportion of vertical and horizontal diameters of said tubes may vary, according to the position and size of the tubes and the capacity of the apparatus.

I find, however, that tubes, of an elliptical section, with the horizontal diameter about twice and a half the vertical diameter, will act reliably.

What I claim, and desire to secure by Letters Patent, is—

A cooler, for beer and other liquids, formed of a series of flattened tubes, with their longest diameters horizontally, substantially as specified, so that the stratum of liquid passes in the manner described.

In witness whereof, I have hereunto set my signature, this 2d day of April, A. D. 1868.

GEO. B. TURRELL.

Witnesses:
GEO. D. WALKER.
CHAS. H. SMITH.